United States Patent
Otake

(10) Patent No.: US 10,351,109 B2
(45) Date of Patent: Jul. 16, 2019

(54) VEHICLE TRAVELING CONTROL APPARATUS

(71) Applicant: TOYOTA JIDOSHA KABUSHIKI KAISHA, Toyota-shi (JP)

(72) Inventor: Hirotada Otake, Susono (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 37 days.

(21) Appl. No.: 15/622,870

(22) Filed: Jun. 14, 2017

(65) Prior Publication Data

US 2017/0369043 A1    Dec. 28, 2017

(30) Foreign Application Priority Data

Jun. 24, 2016  (JP) .................................. 2016-125182

(51) Int. Cl.
*G08B 21/06*  (2006.01)
*B60T 7/12*   (2006.01)
(Continued)

(52) U.S. Cl.
CPC ............... *B60T 7/12* (2013.01); *B60K 28/06* (2013.01); *B60T 7/14* (2013.01); *B60T 17/22* (2013.01);
(Continued)

(58) Field of Classification Search
CPC ... B60T 7/12; B60T 7/14; B60T 17/22; B60T 7/22; B60T 2201/08; B60T 2210/36;
(Continued)

(56) References Cited

U.S. PATENT DOCUMENTS

2016/0091315 A1* 3/2016 Oguri ..................... G01C 21/28
                                                         701/408
2017/0232973 A1* 8/2017 Otake ................. B60W 50/082
                                                          701/43
(Continued)

FOREIGN PATENT DOCUMENTS

JP         2006-315491        11/2006
JP         2008-195402         8/2008
(Continued)

OTHER PUBLICATIONS

Mohamad et al., Abnormal driving detection using real time Global Positioning System data, 2011, IEEE, p. 1-6 (Year: 2011).*

(Continued)

*Primary Examiner* — McDieunel Marc
(74) *Attorney, Agent, or Firm* — Oblon, McClelland, Maier & Neustadt, L.L.P.

(57) ABSTRACT

Driving support ECU sets a driver's state to "temporarily abnormal" and decelerates a vehicle when a driver of the vehicle has been first determined to be in an abnormal state where the driver loses an ability to drive the vehicle. Driving support ECU changes the driver's state to "regularly abnormal" in a case when the abnormal state of the driver remains unchanged when a vehicle speed decreases to a set vehicle speed, and at this point, reports to a help net center HNC. With this configuration, a report to the help net center HNC can be made at an appropriate timing.

5 Claims, 7 Drawing Sheets

(51) Int. Cl.
    *G08B 25/01*     (2006.01)
    *B60K 28/06*     (2006.01)
    *B60T 7/14*     (2006.01)
    *B60T 17/22*     (2006.01)
    *B60T 7/22*     (2006.01)

(52) U.S. Cl.
    CPC ........... *G08B 21/06* (2013.01); *G08B 25/016* (2013.01); *B60T 7/22* (2013.01); *B60T 2201/08* (2013.01); *B60T 2210/36* (2013.01); *B60T 2220/00* (2013.01); *B60T 2260/00* (2013.01); *B60Y 2302/05* (2013.01)

(58) Field of Classification Search
    CPC . B60T 2220/00; B60T 2260/00; B60K 28/06; G08B 21/06; G08B 25/016; B60Y 2302/05
    See application file for complete search history.

(56) References Cited

U.S. PATENT DOCUMENTS

| | | | | |
|---|---|---|---|---|
| 2017/0297567 A1* | 10/2017 | Matsumura | ........... | B60W 30/08 |
| 2017/0369044 A1* | 12/2017 | Otake | ..................... | B60T 17/22 |
| 2018/0001898 A1* | 1/2018 | Otake | ................... | B60W 30/09 |
| 2018/0015827 A1* | 1/2018 | Takano | ................... | B60T 7/042 |
| 2018/0037112 A1* | 2/2018 | Otake | ................... | B60K 28/06 |
| 2018/0037216 A1* | 2/2018 | Otake | .................. | B60W 10/20 |
| 2018/0111628 A1* | 4/2018 | Tamagaki | ................ | B60Q 1/46 |

FOREIGN PATENT DOCUMENTS

| | | |
|---|---|---|
| JP | 4172434 | 10/2008 |
| JP | 2009-73462 | 4/2009 |
| JP | 2009-190464 | 8/2009 |
| JP | 4349210 | 10/2009 |
| JP | 2009-265760 A | 11/2009 |
| JP | 2010-6279 | 1/2010 |
| JP | 4929777 | 5/2012 |
| JP | 2013-152700 | 8/2013 |
| JP | 2014-21767 A | 2/2014 |
| JP | 2014-148293 | 8/2014 |
| JP | 2016-16762 A | 2/2016 |

OTHER PUBLICATIONS

Kamal et al., Driver-Adaptive Assist System for Avoiding Abnormality in Driving, 2007, IEEE, p. 1247-1252 (Year: 2007).*

Krotak et al., The analysis of the acceleration of the vehicle for assessing the condition of the driver, 2012, IEEE, pp. 571-576 (Year: 2012).*

Sathe et al., Advance Vehicle-Road Interaction and Vehicle monitoring System using Smart Phone Applications, 2016, IEEE, p. 1-6 (Year: 2016).*

* cited by examiner

VEHICLE TRAVELING CONTROL APPARATUS

TECHNICAL FIELD

The present invention relates to a vehicle traveling control apparatus which decreases a vehicle speed of a vehicle to stop the vehicle when a driver of the vehicle has fallen into an abnormal state in which the driver loses an ability to drive the vehicle.

BACKGROUND ART

An apparatus has conventionally been proposed which determines whether or not a driver has fallen into an abnormal state where the driver loses an ability to drive a vehicle (for example, a drowsy driving state, a mental and physical failure state, and the like), and decelerates the vehicle when the driver is determined to be in such an abnormal state (for example, refer to Japanese Patent Application Laid-Open (kokai) No. 2009-73462.).

It should be noted that hereinafter an "abnormal state where a driver loses an ability to drive a vehicle" is simply also referred to as an "abnormal state" and a "determination whether or not a driver is in the abnormal state" is simply also referred to as an "abnormality determination of a driver".

SUMMARY OF THE INVENTION

When the driver has fallen into the abnormal state, a rescue request for an emergency facility can be made by using a help network system. In the help network system, a help net center is established where a rescue request is received from a site of an abnormality occurrence, and by reporting to (calling in) the help net center, local emergency facilities are called for service. For example, the help net center acquires a positional information of the vehicle transmitted from a communication device of the vehicle inside which the driver in the abnormal state is. Then, the help net center makes a call for an ambulance as well as a call for a rescue team to head to the vehicle position, and requests a road management station to take care of other vehicles for the stopped vehicle (display messages on electronic message boards and set up traveling restriction signs, and so on, and hereinafter refer to "support other vehicles"), and so on.

When the driver has fallen into the abnormal state, it is desired to rescue the driver by reporting to the help net center as soon as possible. Besides, when a vehicle traveling control apparatus decelerates or stops the vehicle by detecting that the driver is in the abnormal state, it is desired to report to the road management station as soon as possible.

However, in prior art apparatuses, a timing to report to the help net center is not taken into consideration. For example, if a report to the help net center is made immediately at a timing at which the driver is estimated to be in the abnormal state, an erroneous report due to an erroneous estimation of the abnormal state is likely to occur. Conversely, if a report to the help net center is made after making the vehicle stop, a rescue of the driver may be delayed.

The present invention is made in order to resolve the problem above. That is, one of objects of the present invention is to provide a vehicle traveling control apparatus which permits reporting to the help net center at an appropriate timing.

In order to achieve the object above, one feature of a vehicle traveling control apparatus of the present invention lies in that the vehicle traveling control apparatus applied to a vehicle comprises;

abnormality determination means (10, S13, S22, S34) for continuously determining whether or not a driver of the vehicle is in an abnormal state where the driver loses an ability to drive the vehicle;

vehicle position acquisition means (10, 100, 101) for acquiring a positional information representing a current position of the vehicle;

stop traveling means (10, 30, 40, S24, S36) for making the vehicle stop by decreasing a vehicle speed of the vehicle to zero after an abnormality determination point in time which is a point in time at which the driver has been determined to be in the abnormal state; and report means (10, 110, 111, S32) for transmitting to a help net center where a rescue request is arranged the positional information of the vehicle via wireless communication based on a determination result that the driver is in the abnormal state, wherein, the report means is configured to not to transmit the positional information of the vehicle to the help net center until a point in time which is after deceleration of the vehicle was started based on a determination that the driver is in the abnormal state and is before the vehicle is made to stop, and at which a predetermined report permission condition is satisfied in a situation where the determination that the driver is in the abnormal state continues to be made (10, S25: Yes, S203: Yes).

In the present invention, the abnormality determination means continuously conducts the determination whether or not the driver of the vehicle is in the abnormal state in which the driver loses the ability to drive the vehicle. As described later, the abnormality determination of the driver can be conducted by means of various methods. For example, the abnormality determination can be conducted by determining whether or not a state in which the driver does not conduct any operation to drive the vehicle (a state-with-no-driving-operation) continues for more than or equal to a threshold time (a threshold time for the abnormality determination of the driver), or by determining whether or not a state in which the driver does not push a confirmation button even when the driver is urged to push the confirmation button continues for more than or equal to a threshold time, and so on. Alternatively, the abnormality determination can be conducted by using a so called "driver monitor technique" disclosed in Japanese Patent Application Laid-Open (kokai) No. 2013-152700 and so on.

The vehicle position acquisition means acquires the positional information representing a current position of the vehicle. The stop traveling means makes the vehicle stop by decreasing the vehicle speed of the vehicle to zero after the abnormality determination point in time which is a point in time at which the driver has been determined to be in the abnormal state. Besides, the report means transmits to the help net center where the rescue request is arranged the positional information of the vehicle via wireless communication based on the determination result that the driver is in the abnormal state. "Transmitting the positional information of the vehicle to the help net center" means reporting to the help net center that the driver is in the abnormal state. Therefore, hereinafter, "transmitting the positional information of the vehicle to the help net center" is referred to as "reporting".

With this configuration, a call for an ambulance to head to the vehicle position and a request to a road management station for supporting other vehicles and the like can be made at an early timing.

However, if a report to the help net center is made immediately at a timing at which the driver has been determined to be in the abnormal state, an erroneous report due to an erroneous detection of the abnormal state is likely to occur. On the other hand, if a report to the help net center is made after making the vehicle stop, a rescue of the driver may be delayed.

Therefore, the report means does not report to the help net center until the point in time which is after the deceleration of the vehicle was started based on the determination that the driver is in the abnormal state and is before the vehicle is made to stop, and at which the predetermined report permission condition is satisfied in the situation where the determination that the driver is in the abnormal state continues to be made. Hence, when the determination that the driver is in the abnormal state is reversed before the report permission condition is satisfied, it becomes possible not to report to the help net center. For example, if the driver has not actually fallen into the abnormal state, it becomes possible to make the driver become aware of the deceleration of the vehicle to induce the driver to conduct an accelerating operation and the like. If there is such a response from the driver, the determination that the driver is in the abnormal state can be cancelled. On the other hand, if the report permission condition is satisfied without any factors to cancel the determination that the driver is in the abnormal state (for example, without any response from the driver), it becomes possible to report to the help net center at an early timing which is before the vehicle is made to stop.

As a result, according to the present invention, the report to the help net center can be made at an appropriate timing.

One feature of another aspect of the present invention lies in that;

the stop traveling means is configured to start decelerating the vehicle from a temporary abnormality determination point in time which is a point in time at which the driver has been first determined to be in the abnormal state by the abnormality determination means (S17, S24), and the report permission condition is satisfied under a situation where an accuracy of the determination by the abnormality determination means has exceeded an accuracy of a determination at the temporary abnormality determination point in time (S25: Yes, S27).

According to another aspect of the present invention, it is possible to start decelerating the vehicle at an early timing since the vehicle is decelerated from the temporary abnormality determination point in time which is a point in time at which the driver has been first determined to be in the abnormal state. On the other hand, the report permission condition is satisfied under the situation where the accuracy of the determination by the abnormality determination means has exceeded the accuracy of the determination at the temporary abnormality determination point in time which is before the vehicle is made to stop. Therefore, it is possible to report to the help net center at an appropriate timing and to reduce erroneous reports to the help net center.

One feature of another aspect of the present invention lies in that;

the report permission condition is satisfied when a vehicle speed of the vehicle has decreased to a predetermined set vehicle speed (SPD1) greater than zero after deceleration of the vehicle was started (S25: Yes).

According to another aspect of the present invention, the deceleration of the vehicle is started from the temporary abnormality determination point in time, and after that, when the vehicle speed of the vehicle has decreased to the predetermined set vehicle speed greater than zero under the situation where the determination that the driver is in the abnormal state continues to be made, the report permission condition is satisfied. Therefore, the determination whether or not the driver is in the abnormal state can be made continuously during a period from the temporary abnormality determination point in time to a point in time at which the vehicle speed decreases to the set vehicle speed. Hence, at a point in time at which the report permission condition is satisfied, the accuracy of the determination by the abnormality determination means exceeds the accuracy of the determination at the temporary abnormality determination point in time. Accordingly, erroneous reports to the help net center can be reduced.

One feature of another aspect of the present invention lies in that;

the report permission condition is satisfied when a duration time during which the determination that the driver is in the abnormal state continues to be made has reached a set time (t2ref) after deceleration of the vehicle was started (S203: Yes).

According to another aspect of the present invention, the deceleration of the vehicle is started from the temporary abnormality determination point in time, and after that, when the duration time during which the determination that the driver is in the abnormal state continues to be made has reached the set time, the report permission condition is satisfied. Therefore, the determination whether or not the driver is in the abnormal state can be made continuously during a period from the temporary abnormality determination point in time to a point in time at which the duration time reaches the set time. Hence, at a point in time at which the report permission condition is satisfied, the accuracy of the determination by the abnormality determination means exceeds the accuracy of the determination at the temporary abnormality determination point in time. Accordingly, erroneous reports to the help net center can be reduced.

One feature of another aspect of the present invention lies in that;

the report permission condition is satisfied when a vehicle speed of the vehicle decreases to a predetermined set vehicle speed greater than zero and a duration time during which the determination that the driver is in the abnormal state continues to be made reaches a set time after deceleration of the vehicle was started (S25: Yes, S203: Yes), and the stop traveling means is configured to;
  start decelerating the vehicle from the temporary abnormality determination point in time (S24); and
  when a vehicle speed of the vehicle decreases to the set vehicle speed before the duration time reaches the set time (S203: No), keep the vehicle speed of the vehicle (S204) and resume decelerating the vehicle (S36) after the duration time has reached the set time (S203: Yes).

According to another aspect of the present invention, deceleration of the vehicle is started from the temporary abnormality determination point in time. The report permission condition is satisfied in a case when the vehicle speed decreases to the set vehicle speed under the situation where the determination that the driver is in the abnormal state continues to be made after the deceleration of the vehicle was started, and when the duration time during which the determination that the driver is in the abnormal state continues to be made reaches the set time after the deceleration of the vehicle was started.

On the other hand, even when the vehicle speed has decreased to the set vehicle speed, if the above-mentioned duration time has not reached the set time, the report permission condition is not satisfied. In this case, the stop traveling means keeps the vehicle speed of the vehicle. For example, the stop traveling means makes "the vehicle which has been in a decelerated state until that time" travel at a constant speed which is a vehicle speed at that time. Thereby, the determination whether or not the driver is in the abnormal state can be made continuously during a period over which the above-mentioned duration time reaches the set time. That is, the determination accuracy by the abnormality determination means can be raised.

When the above-mentioned duration time has reached the set time, the report permission condition is satisfied. Besides, the stop traveling means resumes decelerating the vehicle. Thereby, enough amount of time can be assigned to determine whether or not the driver is in the abnormal state before making the vehicle stop, making it possible to report to the help net center at a more appropriate timing.

In the above description, references used in the following descriptions regarding embodiments are added with parentheses to the elements of the present invention, in order to assist in understanding the present invention. However, those references should not be used to limit the scope of the invention.

DESCRIPTION OF THE EMBODIMENT

A vehicle traveling control apparatus (driving support apparatus) according to an embodiment of the present invention will be described below, referring to figures.

Figure 1:
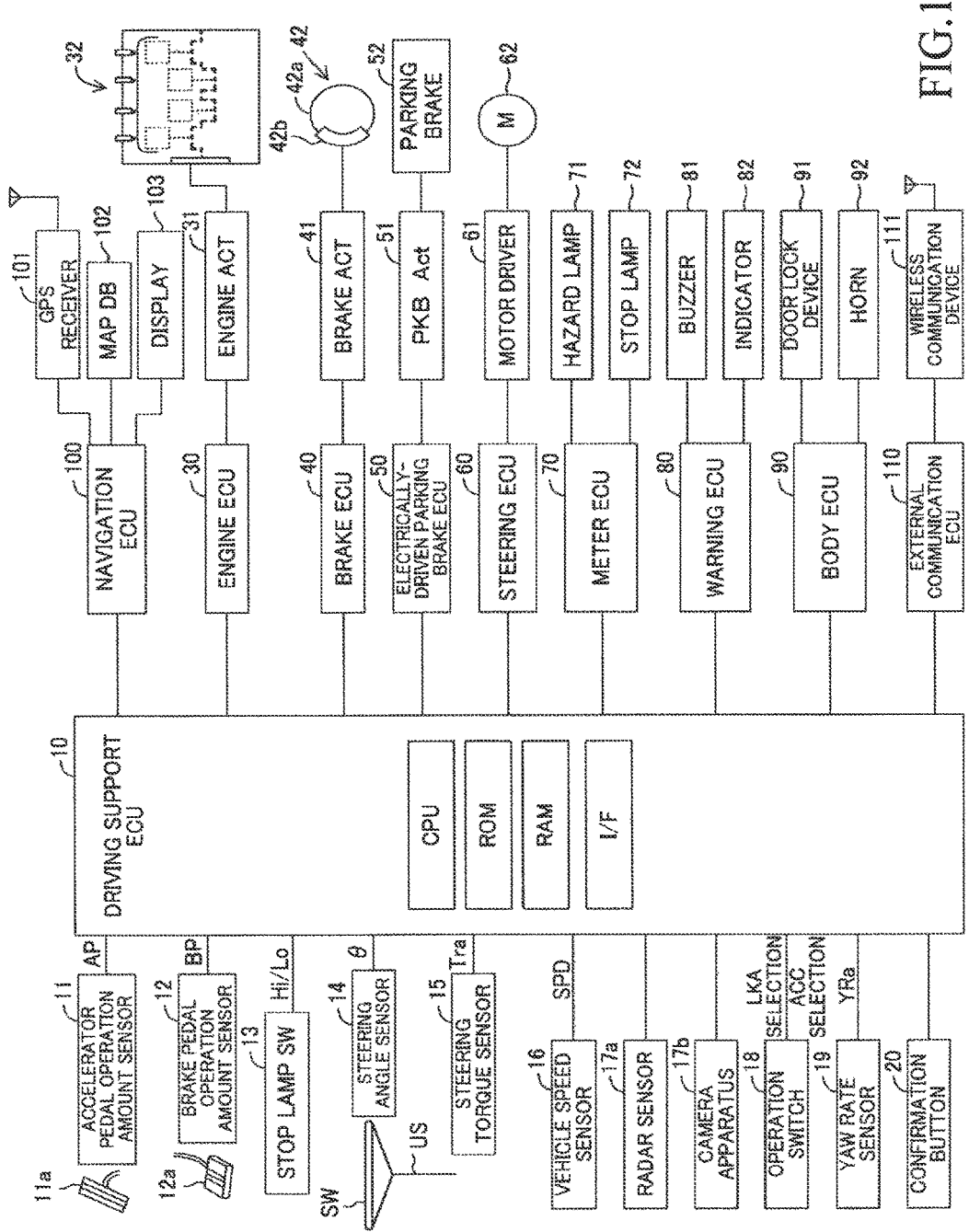
FIG. 1 is a schematic configuration diagram of a vehicle traveling control apparatus according to an embodiment of the present invention.

A vehicle traveling control apparatus according to the embodiment of the present invention is, as shown in FIG. 1, applied to a vehicle (hereinafter, may be referred to as an "own vehicle" in order to distinguish it from other vehicles), and comprises a driving support ECU 10, an engine ECU 30, a brake ECU 40, an electrically-driven parking brake ECU 50, a steering ECU 60, a meter ECU 70, a warning ECU 80, a body ECU 90, a navigation ECU 100, and an external communication ECU 110.

Each of the ECUs is an electric control unit comprising a microcomputer as a main part. Those ECUs are connected via CAN (Controller Area Network) which is not illustrated so that the ECUs are capable of mutually transmitting and receiving information. In the present specification, the microcomputer includes CPU, ROM, RAM, a non-volatile memory, an interface I/F, or the like. The CPU is configured to realize/perform various functions by executing instructions (i.e., programs or routines) stored in the ROM. Some of those ECUs or all of those ECUs may be integrated into one ECU.

The driving support ECU 10 is connected to sensors (including switches) listed below, and is configured to receive a detection signal or an output signal of these sensors. It should be noted that each sensor may be connected to ECUs other than the driving support ECU 10. In this case, the driving support ECU 10 receives the detection signal or the output signal of the sensor via CAN from the ECU to which the sensor is connected.

An accelerator pedal operation amount sensor 11 is configured to detect an operation amount (an accelerator position) of an accelerator pedal 11a of the own vehicle, and to output a signal representing the accelerator pedal operation amount AP.

A brake pedal operation amount sensor 12 is configured to detect an operation amount of a brake pedal 12a of the own vehicle, and to output a signal representing the brake pedal operation amount BP.

A stop lamp switch 13 is configured to output a low level signal when the brake pedal 12a is not being depressed (is not being operated), and to output a high level signal when the brake pedal 12a is being depressed (is being operated).

A steering angle sensor 14 is configured to detect a steering angle of the own vehicle, and to output a signal representing the steering angle θ.

A steering torque sensor 15 is configured to detect a steering torque added to a steering shaft US of the own vehicle by an operation of a steering wheel SW, and to output a signal representing the steering torque Tra.

A vehicle speed sensor 16 is configured to detect a traveling speed (a vehicle speed) of the own vehicle, and to output a signal representing the vehicle speed SPD.

A radar sensor 17a is configured to obtain information regarding a road ahead of the own vehicle, and a three-dimensional object present in the road. The three-dimensional object includes, for example, moving objects such as a pedestrian, a bicycle and an automobile, and static objects such as a power pole, a tree, and a guardrail. Hereinafter, these three-dimensional objects may be referred to as a "target object."

The radar sensor 17a comprises a "radar transmission/reception part and a signal processor", both of which are not illustrated.

The radar transmission/reception part emits an electric wave in a millimeter waveband (hereinafter, referred to as a "millimeter wave") to an ambient region of the own vehicle including a front region of the own vehicle, and receives a millimeter wave (i.e., a reflected wave) reflected from a target object which is present in the emitted area.

The signal processor obtains, every predetermined period of time, an inter-vehicle distance (a longitudinal distance), a relative speed, a lateral distance, a relative lateral speed, and the like, with respect to each detected target object based on a phase difference between the transmitted millimeter wave and the received reflected wave, an attenuation level of the reflected wave, a time from a point in time of transmitting the millimeter wave to a point in time of receiving the reflected wave, or the like.

A camera apparatus 17b comprises a "stereo camera and an image processor", both of which are not illustrated.

The stereo camera photographs/captures landscapes of a left-side region and a right-side region in front of the vehicle to obtain a left-and-right pair of image data.

The image processor is configured to calculate information as to whether or not a target object is present, a relative relationship between the own vehicle and the target object and the like, based on the left-and-right pair of image data photographed/captured by the stereo camera to output them.

It should be noted that the driving support ECU 10 is configured to determine a relative relationship (target object information) between the own vehicle and the target object by composing the relative relationship between the own vehicle and the target object obtained by the radar sensor 17a and the relative relationship between the own vehicle and the target object obtained by the camera apparatus 17b. Further, the driving support ECU 10 is configured to recognize a lane marker such as a left white line and a right white line of a road (hereinafter, simply referred to as a "white line") based on the left-and-right pair of image data (road image data) photographed/captured by the camera apparatus 17b and to obtain a shape of the road (a curvature radius representing a degree of how much the road is curved), a positional relationship between the road and the vehicle, and the like. In addition, the driving support ECU 10 is configured to also obtain the information whether or not a road side wall exists based on the image data photographed/captured by the camera apparatus 17b.

An operation switch 18 is a switch to be operated by a driver. The driver can select whether or not to perform a traffic lane keeping control (LKA: Lane Keeping Assist control) by operating the operation switch 18. Moreover, the driver can select whether or not to perform a trailing inter-vehicle distance control (ACC: Adaptive Cruise Control) by operating the operation switch 18.

A yaw rate sensor 19 is configured to detect a yaw rate of the own vehicle to output an actual yaw rate YRa.

A confirmation button 20 is arranged at a position capable of being operated by the driver. The confirmation button 20 is configured to output a low-level signal when not being operated and to output a high-level signal when being pressed.

The driving support ECU 10 is configured to perform the LKA and the ACC. Further, as described later, the driving support ECU 10 is configured to determine whether or not the driver is in an abnormal state in which the driver loses an ability to drive the vehicle, and to perform various types of control to perform appropriate processes when the driver is determined to be in the abnormal state.

The engine ECU 30 is connected to an engine actuator 31. The engine actuator 31 includes actuators for changing a driving state of an internal combustion engine 32. In the present embodiment, the internal combustion engine 32 is a gasoline fuel injection, spark ignition, multi-cylinder engine, and comprises a throttle valve to adjust an intake air amount. The engine actuator 31 includes at least a throttle valve actuator to change an opening degree of the throttle valve. The engine ECU 30 can change torque which the internal combustion engine 32 generates by driving the engine actuator 31. The torque which the internal combustion engine 32 generates is transmitted to a non-illustrated driving wheels via a non-illustrated transmission gear. Therefore, the engine ECU 30 can control the engine actuator 31 to control a driving force of the own vehicle, so as to change an acceleration state (an acceleration rate).

The brake ECU 40 is connected to a brake actuator 41. The brake actuator 41 is provided in a hydraulic circuit between a non-illustrated master cylinder to compress operating fluid with a depression force of the brake pedal and friction brake mechanisms 42 provided at left-and-right-front wheels and left-and-right-rear wheels. Each of the friction brake mechanisms 42 comprises a brake disc 42a fixed to the wheel and a brake caliper 42b fixed to a vehicle body. The brake actuator 41 adjusts, in response to an instruction from the brake ECT 40, a hydraulic pressure that is supplied to a wheel cylinder which is built in the brake caliper 42, and operates the wheel cylinder with the hydraulic pressure. Thereby, the brake actuator 41 presses a brake pad onto the brake disc 42a to generate a friction braking force. Accordingly, the brake ECU 40 can control the braking force of the own vehicle by controlling the brake actuator 41.

The electrically-driven parking brake ECU (hereinafter, may be referred to as an "EPB ECU") 50 is connected to a parking brake actuator (hereinafter, may be referred to as a "PKB actuator") 51. The PKB actuator 51 is an actuator for pressing the brake pad onto the brake disc 42a or for, in a case when comprising a drum brake, pressing a shoe onto a drum rotating with the wheel. Therefore, EPB ECU 50 can add a parking brake force to the wheel by means of the PKB actuator 51 to maintain the vehicle in a stop state.

The steering ECU 60 is a control apparatus of a well-known electrically-driven power steering system and is connected to a motor driver 61. The motor driver 61 is connected to a steering motor 62. The steering motor 62 is incorporated into a non-illustrated "steering mechanism including the steering wheel, the steering shaft coupled to the steering wheel, a gear mechanism for steering, and the like" of the vehicle. The steering motor 62 generates torque with electric power supplied from the motor driver 61 to be able to add a steering assist torque using the torque, or to turn left-and-right steered wheels.

The meter ECU 70 is connected to a non-illustrated digital indication type meter and is also connected to a hazard lamp 71 and a stop lamp 72. The meter ECU 70 can, in response to an instruction from the driving support ECU 10, make the hazard lamp 71 blink and make the stop lamp 72 light.

The warning ECU 80 is connected to a buzzer 81 and an indicator 82. The warning ECU 80 can, in response to an instruction from the driving support ECU 10, make the buzzer 81 sound to alert the driver, make a mark for alerting (for example, a warning lamp) light on the indicator 82, display a warning message on the indicator 82, and display an operating state of a driving support control on the indicator 82.

The body ECU 90 is connected to a door lock device 91 and a horn 92. The body ECU 90 can unlock the door lock device 91 in response to an instruction from the driving support ECU 10. In addition, the body ECU 90 can make the horn 92 sound in response to an instruction from the driving support ECU 10.

The navigation ECU 100 is connected to a GPS receiver 101, a map database 102, a touch-screen display 103, and so on. The GPS receiver 101 receives a GPS signal for detecting a current position of the own vehicle. The map database 102 stores map information etc. The touch-screen display 103 is a human machine interface. The navigation ECU 100 identifies the current position of the own vehicle based on the GPS signal, and performs various types of processing based on the own vehicle position and on the map information etc. stored in the map database 102 to perform a route guidance using the display 103.

The map information stored in the map database 102 includes road information. The road information includes parameters representing a shape of a road for every section (for example, a curvature radius or a curvature of a road representing a degree of curve of the road). It should be noted that the curvature is a reciprocal of the curvature radius.

Figure 2:
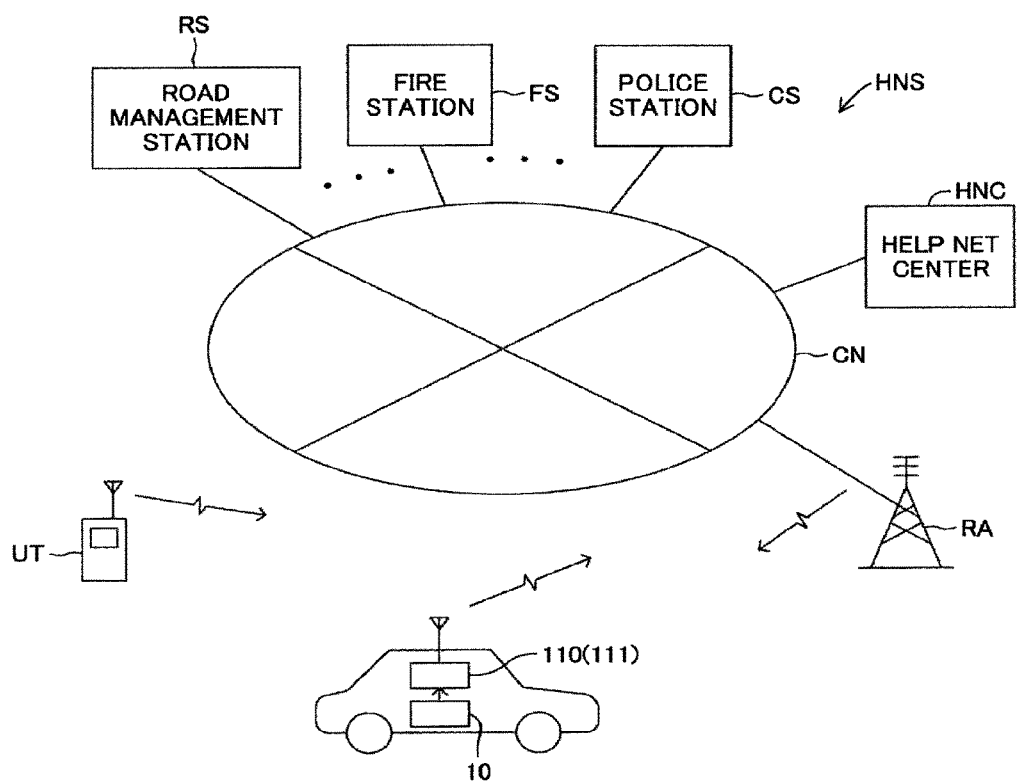
FIG. 2 is a schematic configuration diagram of a help network system.

The external communication ECU 110 is connected to a wireless communication device 111. The external communication ECU 110 and the wireless communication device 111 are wireless communication terminals for connecting to a help network system. As shown in FIG. 2, the help network system HNS is configured by including a communication network CN, and a help net center HNC connected to the communication network CN, and a fire station FS, a police station CS and a road management station RS, each of which is connected to the communication network CN (hereinafter, these may also be referred to as an "on-site processing department".), and a wireless relay base station RA connected to the communication network CN, and user communication terminals UT which the user of this system possesses. One of the user communication terminals UT corresponds to the external communication ECU 110 (including the wireless communication device 111). It should be noted that the help net center HNC, the fire station FS, the police station CS and the road management station RS, each of which is connected to the communication network CN means a communication device provided at each of those institutions.

Upon reception of a help net connection instruction from the driving support ECU 10, the external communication ECU 110 actuates the wireless communication device 111 to perform a communication connection to the help net center HNC. The help net center HNC comprises a communication device for transmitting/receiving signals to/from unspecified large number of user communication terminals UT. In the present specification, "communicating with the help net center" means communicating with the communication device provided at the help net center HNC.

In addition, the external communication ECU 110 comprises a microphone and a speaker for a telephone call with an operator at the help net center HNC, and is also configured to report on-site information to the operator from an inside of the own vehicle. Further, the external communication ECU 110 comprises a call button as well for calling the help net center HNC. It should be noted that in the present embodiment, processing under the following situation will be described, that is, the situation where the driver is in the abnormal state in which the driver cannot perform driving operations, namely, the driver cannot make a telephone call with the operator using these functions.

Upon reception of the help net connection instruction from the driving support ECU 10, the external communication ECU 110 obtains from the navigation ECU 100 the current position of the own vehicle detected with the GPS receiver 21, and transmits to the help net center HNC a signal (hereinafter, may be referred to as a "help signal") including a vehicle position information representing the current position and an ID number which identifies the own vehicle (for example, a vehicle number). As will be described later, the driving support ECU 10 continuously performs a determination whether or not the driver is in the abnormal state in which the driver loses the ability to drive the vehicle while the vehicle is traveling. The driving support ECU 10 transmits the help net connection instruction to the external communication ECU 110 when the driver has been determined to be in the abnormal state. The external communication ECU 110 transmits the help signal to the help net center HNC using the wireless communication device 111 based on this help net connection instruction.

Upon reception of the help signal, the help net center HNC searches for an on-site processing department in charge of an area where the vehicle which has transmitted the help signal is positioned, and transmits various types of information to the searched on-site processing department. The on-site processing department dispatches emergency vehicles such as an ambulance, a police vehicle and so on to the site based on the various types of information transmitted from the help net center HNC, and then rescues the driver, carries the driver to a hospital as well as supports other vehicles (displays messages on electronic message boards and sets up traveling restriction signs, and so on).

<Summary of Control Processing>

Next, summary of the control processing performed by the driving support ECU 10 will be described. The driving support ECU 10 repeatedly determines whether or not "the driver is in the abnormal state in which the driver loses the ability to drive the vehicle (may be simply referred to as an "abnormal state")" while the vehicle is traveling. The driving support ECU 10 classifies a current state of the driver into the following three phases, "normal", "temporarily abnormal", and "regularly abnormal", and performs processing corresponding to each phase. When the driver has been first determined to be in the abnormal state, the driving support ECU 10 changes the state of the driver from "normal" which had been set until that time to "temporarily abnormal".

When the driving support ECU 10 sets the driver's state to "temporarily abnormal", the driving support ECU 10 warns the driver for urging the driver to conduct driving operations, and forces the vehicle to decelerate to a predetermined speed at a constant deceleration. In this case, it is preferable that the driving support ECU 10 starts the traffic lane keeping control (LKA) if the traffic lane keeping control (LKA) has not been conducted.

When the driver resumes the driving operations after having recognized the warning or the deceleration of the vehicle, the driving support ECU 10 detects the driving operations by the driver and changes the driver's state from "temporarily abnormal" which had been set until that time back to "normal". In this case, the warning to the driver and the deceleration of the vehicle which had been performed until that time are terminated.

On the other hand, when the driver does not conduct any driving operations and the vehicle speed of the own vehicle decreases to the predetermined speed, it is highly likely that the driver is in the abnormal state. Therefore, the driving support ECU 10 sets the driver's state to "regularly abnormal", and starts transmitting the help signal to the help net center HNC as well as makes the vehicle stop by decelerating the vehicle at the constant deceleration. Accordingly, erroneous reports (that is, transmitting the help signal in spite of that the driver is not actually in the abnormal state) to the help net center HNC can be suppressed and the report to the help net center HNC is prevented from being delayed.

The traveling control of the vehicle stated above is conducted when the driver's abnormality is detected under a situation where a trailing inter-vehicle distance control (ACC) is being conducted. When the trailing inter-vehicle distance control is being conducted, the vehicle travels without an accelerator pedal operation by the driver. Therefore, in a case when the driver's abnormality is being detected, a deceleration control which makes a vehicle decelerate at a predetermined target deceleration is conducted in place of the trailing inter-vehicle distance control.

Now, the traffic lane keeping control and the trailing inter-vehicle distance control will be described first.

<Traffic Lane Keeping Control (LKA)>

The traffic lane keeping control (hereinafter, referred to as "LKA") is a control to support a steering operation of the driver by adding the steering torque to the steering mechanism so that a position of the own vehicle is kept nearby (in the vicinity of) a target traveling line in a "lane on which the own vehicle is traveling (a traveling lane)". The LKA itself is well known (for example, refer to Japanese Patent Applications Laid-Open (kokai) No. 2008-195402, No. 2009-190464, No. 2010-6279, and Japanese Patent No. 4349210, and so on.). Therefore, a simple description will next be made below.

The driving support ECU 10 performs the LKA when the LKA is being requested by the operation of the operation switch 18. The driving support ECU 10 recognizes (obtains) "the left white line LL and the right white line LR" of the lane on which the own vehicle is traveling based on the image data transmitted from the camera apparatus 17b when the LKA is being requested, and determines a central position of a pair of these white lines to be a target traveling line Ld. In addition, the driving support ECU 10 calculates a curve radius (a curvature radius) R of the target traveling line Ld, and a position and a direction of the own vehicle in a traveling line defined by the left white line LL and the right white line LR.

Then, the driving support ECU 10 calculates a distance Dc (hereinafter, referred to as a "center distance Dc") in a width direction of a road between a central position of a front end of the own vehicle and the target traveling line Ld, and a deviation angle θy (hereinafter, referred to as a "yaw angle θy") between a direction of the target traveling line Ld and the traveling direction of the own vehicle.

Further, the driving support ECU 10 calculates a target yaw rate YRc* using the following formula (1) based on the center distance Dc, the yaw angle θy, and a road curvature v (=1/curvature radius R) every time a predetermined calculation interval elapses. In the formula (1), K1, K2 and K3 are control gains. The target yaw rate YRc* is a yaw rate set so that the own vehicle can travel along the target traveling line Ld.

$$YRc^* = K1 \times Dc + K2 \times \theta y + K3 \times v \quad (1)$$

The driving support ECU 10 calculates a target steering torque Tr* for obtaining the target yaw rate YRc* based on the target yaw rate YRc* and the actual yaw rate YRa every time a predetermined calculation interval elapses. More specifically, the driving support ECU 10 stores a lookup table in advance which defines a relationship between a "deviation between the target yaw rate YRc* and the actual yaw rate YRa" and the "target steering torque Tr*", and calculates the target steering torque Tr* by applying the deviation between the target yaw rate YRc* and the actual yaw rate YRa to the table. Thereafter, the driving support ECU 10 controls the steering motor 62 using the steering ECU 60 so that the actual steering torque Tra matches with (becomes equal to/coincides with) the target steering torque Tr*. It should be noted that the LKA is a control that only assists a steering wheel operation by the driver such that the own vehicle travels along the target traveling line, and the LKA is not a control that permits "driving without holding the steering wheel". Therefore, the driver is required to hold the steering wheel. The above description is a summary of the LKA.

<Trailing Inter-Vehicle Distance Control (ACC)>

The trailing inter-vehicle distance control (hereinafter, referred to as "ACC") is a control to make the own vehicle trail the preceding vehicle traveling right ahead the own vehicle, while keeping the inter-vehicle distance between the preceding vehicle and the own vehicle to be/at a predetermined distance. The ACC itself is well known (for example, refer to Japanese Patent Applications Laid-Open (kokai) No. 2014-148293 and No. 2006-315491, and Japanese Patents No. 4172434, and No. 4929777 and so on.) Therefore, a simple description will be made below.

The driving support ECU 10 performs the ACC in a case when the ACC is being requested by the operation of the operation switch 18.

More specifically, the driving support ECU 10 selects a trailing target vehicle (i.e., a trailing objective vehicle) based on the target object information obtained by the radar sensor 17a and the camera apparatus 17b in a case when the ACC is being requested. For example, the driving support ECU 10 determines whether or not a relative position of the target object (n) identified by the lateral distance Dfy(n) and the inter-vehicle distance Dfx(n) of the detected target object (n) exists (or, is present) in a trailing target vehicle area which is set in advance so as to have a lateral length that becomes smaller as the inter-vehicle distance becomes larger. Thereafter, when the relative position of the target object exists (or, is present) in the trailing target vehicle area for more than or equal to a predetermined time, the driving support ECU 10 selects the target object (n) as the trailing target vehicle.

Further, the driving support ECU 10 calculates a target acceleration Gtgt using either a formula (2) or a formula (3) below. In the formula (2) and the formula (3), a Vfx(a) is a relative speed of the trailing target vehicle (a), k1 and k2 are predetermined positive gains (coefficients), and ΔD1 is an inter-vehicle deviation obtained by subtracting a "target inter-vehicle distance Dtgt" from an "inter-vehicle distance Dfx(a) of the trailing target vehicle (a)" (=Dfx(a)−Dtgt). It should be noted that the target inter-vehicle distance Dtgt is calculated by multiplying a target inter-vehicle time Ttgt which is set by the driver by using the operation switch 18 by the vehicle speed SPD of the own vehicle (that is, Dtgt=Ttgt×SPD).

The driving support ECU 10 determines the target acceleration Gtgt by using (in accordance with) the following formula (2) in a case when the value (k1×ΔD1+k2×Vfx(a)) is positive or "0". Ka1 is a positive gain (coefficient) for an acceleration and is set to be a value less than or equal to be "1".

The driving support ECU 10 determines the target acceleration Gtgt by using (in accordance with) the following formula (3) in a case when the value (k1×ΔD1+k2×Vfx(a)) is negative. Kd1 is positive a gain (coefficient) for a deceleration and is set to be "1" in the present embodiment.

$$Gtgt \text{ (for the acceleration)} = ka1 \times (k1 \times \Delta D1 + k2 \times Vfx(a)) \quad (2)$$

$$Gtgt \text{ (for the deceleration)} = kd1 \times (k1 \times \Delta D1 + k2 \times Vfx(a)) \quad (3)$$

It should be noted that in a case when the target object does not exist (or not be present) in the trailing target vehicle area, the driving support ECU 10 determines the target acceleration Gtgt based on a "target speed which is set depending on the target inter-vehicle time Ttgt" and the vehicle speed SPD, in such a manner that the vehicle speed SPD matches with (becomes equal to) the target speed.

The driving support ECU 10 controls the engine actuator 31 through the engine ECU 30, and when needed, controls the brake actuator 41 through the brake ECU 40 in such a manner that the acceleration of the own vehicle matches with the target acceleration Gtgt. The above description is a summary of the ACC.

<Specific Control Routine>

Next, the traveling control processing performed by the driving support ECU 10 will be described. The driving support ECU 10 performs the traveling control of the vehicle and at the same time, controls a report to the help net center HNC by performing the following routines in parallel, that is, a routine under a normal state shown in FIG. 3, a routine under a temporarily abnormal state shown in FIG. 4, and a routine under a regularly abnormal state shown in FIG. 5 every time a predetermined calculation interval elapses.

The driving support ECU 10 sets the current driver's state, classifying the state into "normal", "temporarily abnormal", and "regularly abnormal", and stores the set state. A temporary abnormality flag F1 and a regular abnormality flag F2 are used as information showing the driver's state. The value of the temporary abnormality flag F1 being "1" means that the current state of the driver is "temporarily abnormal". The value of the regular abnormality flag F2 being "1" means that the current state of the driver is "regularly abnormal". The values of the temporary abnormality flag F1 and the regular abnormality flag F2 being both "0" means that the current state of the driver is "normal". At a point in time when the ignition key is turned on, the temporary abnormality flag F1 and the regular abnormality flag F2 are initialized to be set to "0", respectively (F1=0, F2=0).

Figure 3:
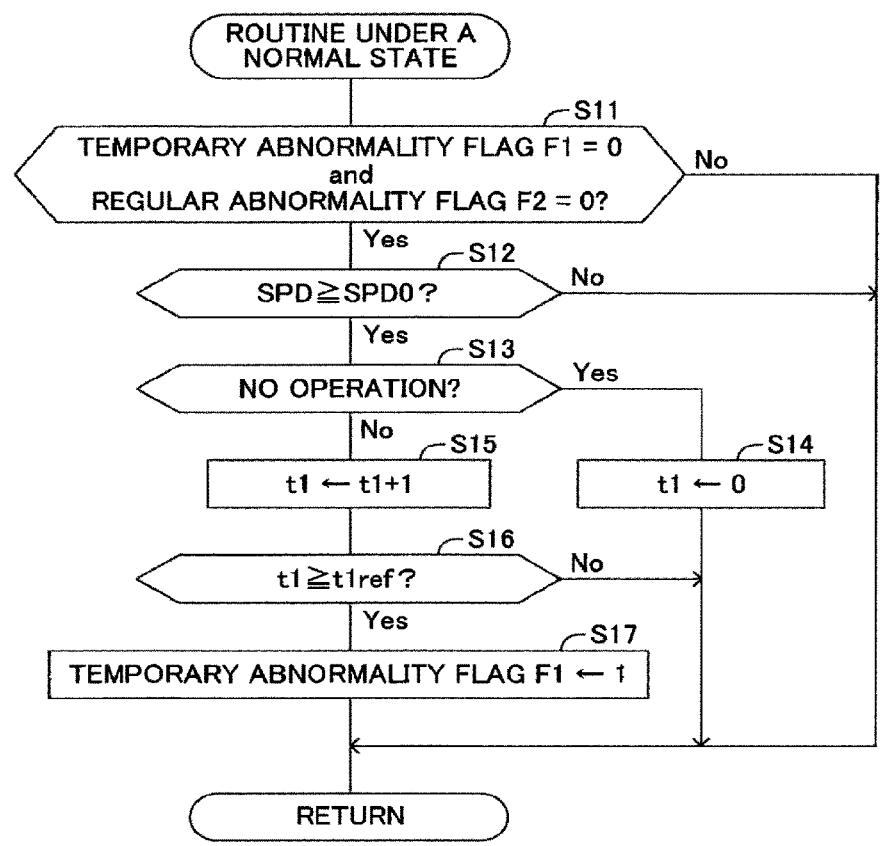
FIG. 3 is a flowchart showing a routine under a normal state.
Figure 4:
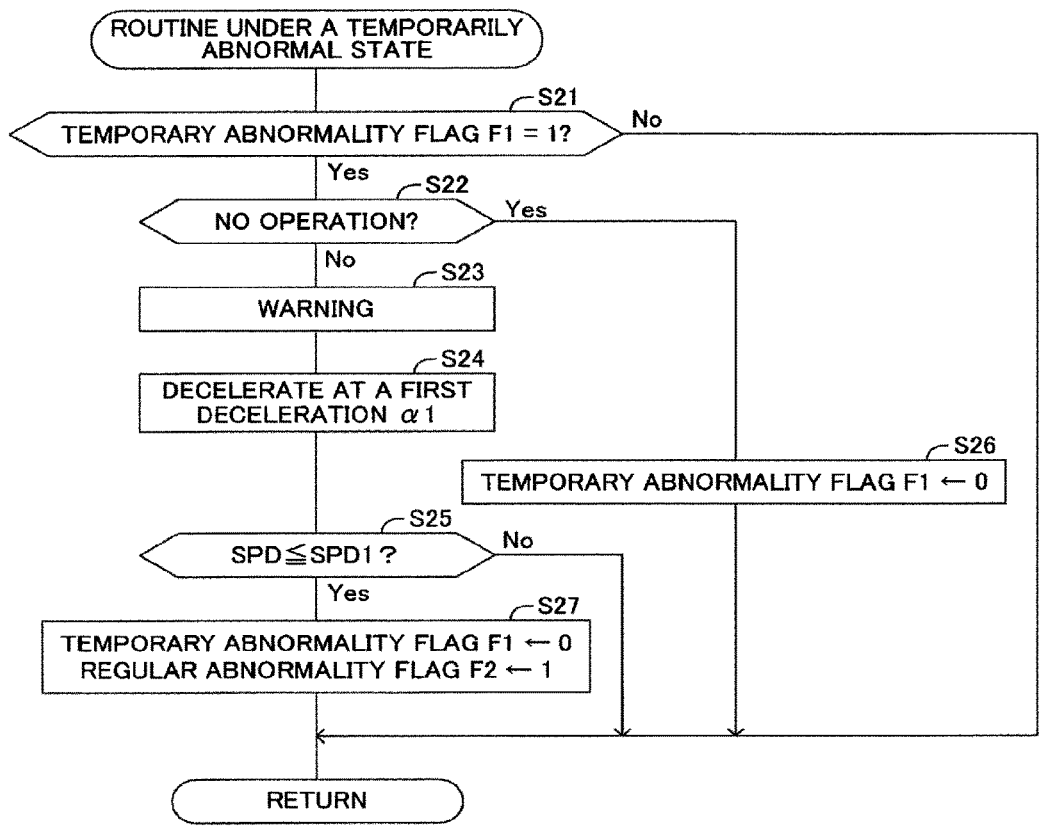
FIG. 4 is a flowchart showing a routine under a temporarily abnormal state.
Figure 5:
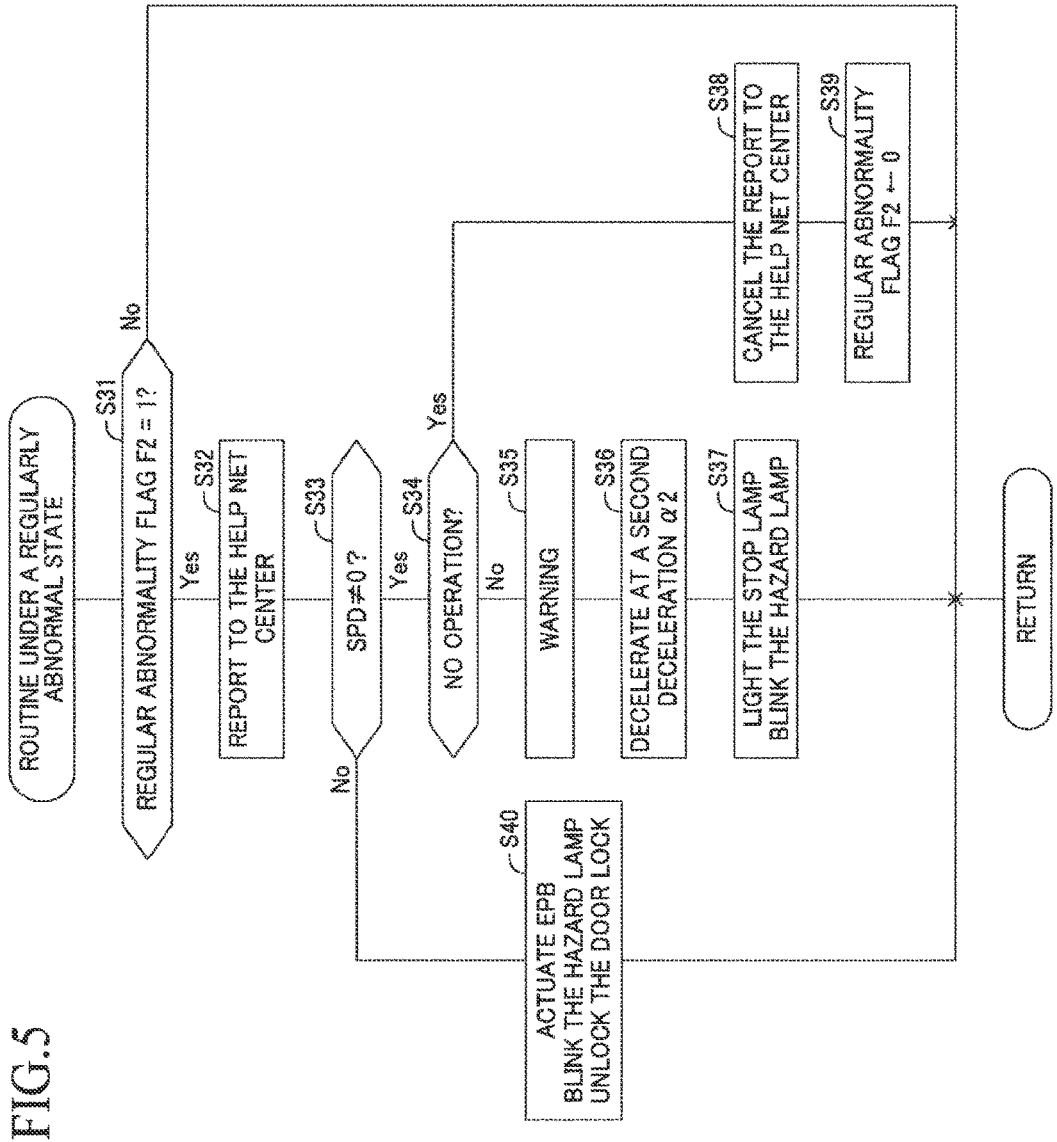
FIG. 5 is a flowchart showing a routine under a regularly abnormal state.

When an ignition switch is turned on, the routines in FIG. 3, FIG. 4, and FIG. 5 start. In this case, since the temporary abnormality flag F1 and the regular abnormality flag F2 have been initialized (F1=0, F2=0), the routine under the normal state in FIG. 3 substantially functions. Hereinafter, a description will be made, starting with the routine under the normal state in FIG. 3. It should be noted that the routine under the normal state in FIG. 3 will be activated when the ACC is being performed.

When the routine under the normal state is started, the driving support ECU 10 determines, at a step S11, whether or not the temporary abnormality flag F1 and the regular abnormality flag F2 are both "0". The driving support ECU 10 makes an "Yes" determination since the temporary abnormality flag F1 and the regular abnormality flag F2 have been initialized right after the ignition switch was turned on. In this case, the driving support ECU 10 proceeds to a step S12 to determine whether or not the vehicle speed SPD is more than or equal to an abnormality determination permission vehicle speed SPD0 set in advance. The driving support ECU 10 tentatively terminates this routine under the normal state in a case when the vehicle speed SPD does not reach the abnormality determination permission vehicle speed SPD0. It should be noted that this abnormality determination permission vehicle speed SPD0 is set to a value higher than a first vehicle speed SPD1 described later.

In a case when the vehicle speed SPD is determined to reach the abnormality determination permission vehicle speed SPD0 (S12: Yes) as a result of repeating the determination processes stated above, the driving support ECU 10 determines, at a step S13, whether or not the driver is in a state where the driver does not perform any driving operation (a state-with-no-driving-operation). The state-with-no-driving-operation is a state where any of parameters consisting of one or more combinations of "the accelerator pedal operation amount AP, the brake pedal operation amount BP, the steering torque Tra, and a signal level of the stop lamp switch 13" which vary depending on a driver does not change. In the present embodiment, the driving support ECU 10 regards a state where any of "the accelerator pedal operation amount AP, the brake pedal operation amount BP, and the steering torque Tra" does not change as well as the steering torques remains "0" as the state-with-no-driving-operation.

In a case when the current state is not the state-with-no-driving-operation (S13: Yes), the driving support ECU 10 clears, at a step S14, a value of a temporary abnormality determination timer t1 to zero and tentatively terminates the routine under the normal state. The value of the temporary abnormality determination timer t1 is set to "0" when the ignition switch is turned on.

When the state-with-no-driving-operation is detected as a result of repeating the processes stated above, the driving support ECU 10 increases, at a step S15, the value of the temporary abnormality determination timer t1 by "1". Therefore, the value of the temporary abnormality determination timer t1 represents a time during which the state-with-no-driving-operation continues.

Next, the driving support ECU 10 determines, at a step S16, whether or not the value of the temporary abnormality determination timer t1 is more than or equal to a temporary abnormality confirmation time t1ref set in advance. When the duration time of the state-with-no-driving-operation is less than the temporary abnormality confirmation time t1ref, the driving support ECU 10 tentatively terminates the routine under the normal state.

When an operation by the driver is detected (S13: Yes) in the middle of the repetition of the processes stated above, the value of the temporary abnormality determination timer t1 is cleared to zero at the step S14.

On the other hand, when the value of the temporary abnormality determination timer t1 reaches the temporary abnormality confirmation time t1ref without the driving operations by the driver being detected (S16: Yes), the driving support ECU 10 proceeds to a step S17 to set the temporary abnormality flag F1 to "1". A timing at which this temporary abnormality flag F1 has been set to "1" is a timing at which the driving support ECU 10 has first determined that the driver is in the abnormal state where the driver loses the ability to driver the vehicle (a timing at which the driving support ECU 10 has temporarily determined that the driver is in the abnormal state). After the temporary abnormality flag F1 was set to "1", a determination at the step S11 becomes "No", and the routine under the temporarily abnormal state (FIG. 4) will substantially function in place of the routine under the normal state (FIG. 3).

It should be noted that when the temporary abnormality flag F1 is set to "1" and when the regular abnormality flag F2 is set to "1", the driving support ECU 10 is preferred to automatically perform the LKA. That is, it is preferable that the driving support ECU 10 forcibly perform the LKA even when the operation switch 18 is not selected to perform the LKA. Accordingly, even when the driver does not perform the steering operation, the own vehicle can be made to travel along the target traveling line (the central position of the left and right white lines). In addition, when the temporary abnormality flag F1 is set to "1" and when the regular abnormality flag F2 is set to "1", the driving support ECU 10 stops the ACC and decelerates the vehicle as described later.

When the routine under the temporarily abnormal state (FIG. 4) is started, the driving support ECU 10 determines, at a step S21, whether or not the temporary abnormality flag F1 is "1". The driving support ECU 10 makes an "Yes" determination right after the temporary abnormality flag F1 was set to "1", and proceeds to a step S22. The driving support ECU 10 determines, at a step S22, whether or not the driver is in the state where the driver does not perform any driving operation (the state-with-no-driving-operation). This determination process is the same as the determination process in the step S13. When the state is determined to be the state-with-no-driving-operation (S22: No), the driving support ECU 10 proceeds to a step S23, and outputs a no-driving-operation warning instruction to the warning ECU 80. Accordingly, the warning ECU 80 makes a warning sound from the buzzer 81, makes a warning lamp blink on the indicator 82, and displays a warning message urging the driver to operate any one of "the accelerator pedal 11a, the brake pedal 12a, and the steering wheel SW".

Next, the driving support ECU 10 decelerates, at a step S24, the own vehicle at a constant first deceleration α1 set in advance. In this case, the driving support ECU 10 calculates an acceleration of the own vehicle from a change amount of the vehicle speed SPD per unit time obtained based on the signal from the vehicle speed sensor 16, and outputs an instruction signal for matching the acceleration with the first deceleration α1 to the engine ECU 30 and the brake ECU 40. In the present embodiment, this first deceleration α1 is set to a deceleration, an absolute value thereof is extremely small.

Subsequently, the driving support ECU 10 determines, at a step S25, whether or not the vehicle speed SPD has become less than or equal to the first vehicle speed SPD1 set in advance. When the vehicle speed SPD exceeds the first vehicle speed SPD1 (S25: No), the driving support ECU 10 tentatively terminates the routine under the temporarily abnormal state. The first vehicle speed SPD1 is a lowest value of the vehicle speed under the temporarily abnormal state, and set to a value higher than zero.

When an operation by the driver is detected (S22: Yes) in the middle of the repetition of the processes stated above, the driving support ECU 10 proceeds to a step S26 and sets the temporary abnormality flag F1 to "0". That is, the driving support ECU 10 withdraws the determination that the driver is in the abnormal state where the driver loses the ability to drive the vehicle to set the driver's state to "normal". In this case, the routine under the normal state mentioned above (FIG. 3) will substantially function in place of the routine under the temporarily abnormal state (FIG. 4).

The driver is expected to perform driving operations (for example, perform a depressing operation of the accelerator pedal by noticing the deceleration of the vehicle) by warning the driver and decelerating the vehicle as described above. Therefore, when any driving operation is not detected, it is highly likely that the driver is in the abnormal state where the driver loses the ability to drive the vehicle. Hence, when the vehicle speed SPD has become less than or equal to the first vehicle speed SPD1 (S25: Yes) without the driving operations by the driver being detected, the driving support ECU 10 sets, at a step S27, the regular abnormality flag F2 to "1" in place of the temporary abnormality flag F1. That is, the temporary abnormality flag F1 is set to "0" and the regular abnormality flag F2 is set to "1".

That is to say, the regular abnormality flag F2 is set to "1" at a timing at which a determination accuracy (estimation accuracy) of the driver's abnormal state is higher than a determination accuracy of when the driver has been first determined to be in the abnormal state where the driver loses the ability to driver the vehicle at the step S17 (the temporary determination). After the regular abnormality flag F2 was set to "1", a determination at the step S21 becomes "No", and the routine under the regularly abnormal state (FIG. 5) will substantially function in place of the routine under the temporarily abnormal state (FIG. 4).

When the routine under the regularly abnormal state is started, the driving support ECU 10 determines, at a step S31, whether or not the regular abnormality flag F2 is "1". The driving support ECU 10 makes an "Yes" determination right after the regular abnormality flag F2 was set to "1", and proceeds to a step S32. The driving support ECU 10 outputs, at the step S32, the help net connection instruction to the external communication ECU 110. Accordingly, the help signal is transmitted to the help net center HNC from the wireless communication device 111. The help signal is a signal representing that the driver is in the abnormal state where the driver loses the ability to drive the vehicle, and includes the positional information of the own vehicle at the current time and the ID for identifying the own vehicle.

Next, the driving support ECU 10 determines, at a step S33, whether or not the own vehicle is not in a stop state based on the vehicle speed SPD. When this determination is made for the first time, the driving support ECU 10 makes an "Yes" determination since the own vehicle is not in the stop state. In this case, the driving support ECU 10 proceeds to a step S34, and determines whether or not the driver is in a state where the driver does not perform any driving operation (a state-with-no-driving-operation). This determination process may be the same as the determination processes in the steps S13 and S22, or may require a detection of a more specific driving operation than the above-mentioned driving operations. When the state is determined to be the state-with-no-driving-operation (S34: No), the driving support ECU 10 proceeds to a step S35, and performs a warning to the driver. This process may be the same as the process at the step S23. Alternatively, a warning level may be raised at the step S35 (for example, turn a warning volume up).

Subsequently, the driving support ECU 10 decelerates, at a step S36, the own vehicle at a constant second deceleration α2 set in advance. In the present embodiment, this second deceleration α2 is set to a value, an absolute value thereof is larger than the absolute value of the first deceleration α1. Next, the driving support ECU 10 outputs, at a step S37, a lighting instruction of the stop lamp 72 and a blinking instruction of the hazard lamp 71 to the meter ECU 70. As a result, the stop lamp 72 lights and the hazard lamp 71 blinks, making it possible to alert a driver of a following vehicle. The driving support ECU 10 tentatively terminates the routine under the regularly abnormal state after performing the process of the step S37.

The driving support ECU 10 decelerates the own vehicle, transmitting the help signal to the help net center HNC by repeating the processes described above. Accordingly, the help net center HNC can make an emergency dispatch request to the on-site processing department which is in charge of the area where the own vehicle is positioned.

When the driving operation by the driver is detected (S34: Yes) in the middle of the processes stated above, the driving support ECU 10 transmits, at a step S38, a cancel signal to the help net center HNC. Subsequently, the driving support ECU 10 sets, at a step S39, the regular abnormality flag F2 to "0" to tentatively terminate the routine under the regularly abnormal state. In this case, the processes such as the deceleration control of the own vehicle, the warning, the alert to the following vehicle, and so on which had been performed until that time are terminated, and a usual vehicle control (a vehicle control based only on the operations by the driver) will be resumed.

It should be noted that the process at the step S39 may not be performed immediately at a timing at which the driver's driving operation has been detected. For example, when the driver's driving operation has been detected during the deceleration control, the driving support ECU 10 may prohibit an acceleration override (invalidate an acceleration request based on the accelerator pedal operation) to continue the deceleration control, and may set the regular abnormality flag F2 to "0" after making the own vehicle stop.

On the other hand, when the own vehicle has stopped without any driving operation by the driver being detected (S33: No), the driving support ECU 10 outputs, at a step S40, an actuation instruction of the electrically-driven parking brake to the electrically-driven parking brake ECU 50, the blinking instruction of the hazard lamp 71 to the meter ECU 70, and an unlock instruction of the door lock device 91 to the body ECU 90. Accordingly, the electrically-driven parking brake is brought into an actuation state, a blinking state of the hazard lamp 71 is continued, and the door lock device 91 is brought into an unlock state. In addition, the driving support ECU 10 prohibits the acceleration override while the own vehicle is in the stop state. The driving support ECU 10 tentatively terminates the routine under the regularly abnormal state after performing the process of the step S40.

After the own vehicle has stopped, the regular abnormality flag F2 is brought back to "0" by a predetermined abnormality canceling operation. For example, the regular abnormality flag F2 is brought back to "0" by turning off the ignition switch, operating an operating device etc. arranged for the abnormality cancellation or the like. Therefore, a rescue worker who has arrived at the site upon receiving a dispatch request from the help net center HNC can bring the vehicle back to the normal state by performing the abnormality canceling operation. Therefore, the transmission of the help signal and the blinking of the hazard lamp 71 will have been continued until the abnormality canceling operation is performed.

According to the vehicle traveling control apparatus of the present embodiment described above, there is a possibility that the driver has fallen into the abnormal state when the state-with-no-driving-operation has continued for more than or equal to the temporary abnormality confirmation time t1ref (S16: Yes). Therefore, the driving support ECU 10 sets the driver's state to "temporarily abnormal" (S17). When the driver's state has been set to "temporarily abnormal", the warning to the driver is issued (S23) and the deceleration of the vehicle is started (S24). When the driver does not resume driving by the time the vehicle speed reaches the first vehicle speed SPD1 (S25: No), it is highly likely that the driver is in the abnormal state.

Therefore, the driving support ECU 10 changes the driver's state to "regularly abnormal", and starts the transmission of the help signal to the help net center HNC (S32) when it has been confirmed that the driver does not resume driving even when the vehicle speed reaches the first vehicle speed SPD1. In addition, when the driver's state has been set to "regularly abnormal", the driving support ECU 10 decelerates the own vehicle in order to stop the vehicle. This deceleration is set to a value, an absolute value thereof is larger than the absolute value of the deceleration under the "temporarily abnormal" state. Therefore, it becomes possible to stop the own vehicle early.

As a result, according to the vehicle traveling control apparatus of the present embodiment, the report to the help net center HNC can be made at an appropriate timing. That is, the reduction of erroneous reports to the help net center HNC and reports at early timings can be realized at the same time. Accordingly, it becomes possible to improve reliability of the vehicle traveling control apparatus, to rescue a driver at an early timing, and to reduce a risk that a following vehicle crashes into the own vehicle by supporting other vehicles at an early timing.

MODIFICATION EXAMPLE 1 OF THE ROUTINE UNDER THE TEMPORARILY ABNORMAL STATE

Next, a modification example 1 of the routine under the temporarily abnormal state will be described. In the routine under the temporarily abnormal state of the above-mentioned embodiment (FIG. 4), when the vehicle speed SPD has become less than or equal to the first vehicle speed SPD1 after the deceleration of the own vehicle and the warning to the driver were started, the driver's state is switched from "temporarily abnormal" to "regularly abnormal" and the help signal is transmitted to the help net center HNC. That is, a report permission condition to the help net center HNC is satisfied under a situation where "the vehicle speed SPD has become less than or equal to the first vehicle speed SPD1 with the state-with-no-driving-operation being kept after the driver's state was set to "temporarily abnormal"".

In contrast, in the modification example 1 of a routine under the temporarily abnormal state, a report permission condition is satisfied under a situation where the vehicle speed SPD decreases to less than or equal to the first vehicle speed SPD1 with the state-with-no-driving-operation being kept and the state-with-no-driving-operation has continued for a predetermined time from a point in time at which "temporarily abnormal" was set after the driver's state was set to "temporarily abnormal".

Figure 6:
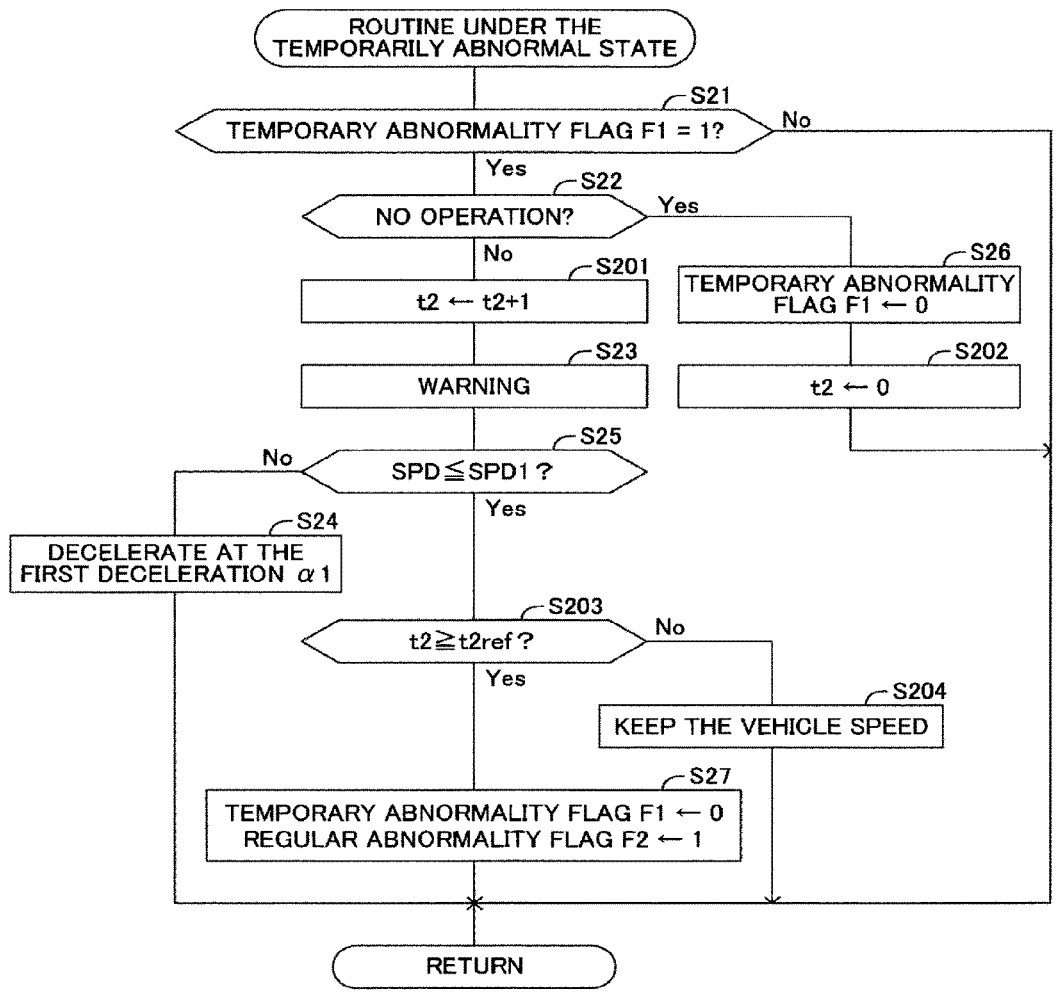
FIG. 6 is a flowchart showing a first modification example of a routine under a temporarily abnormal state.

FIG. 6 shows the modification example 1 of the routine under the temporarily abnormal state. The driving support ECU 10 repeatedly performs a routine under the temporarily abnormal state of the modification example 1 (FIG. 6) instead of the routine under the temporarily abnormal state of the embodiment (FIG. 4) every time a predetermined calculation interval elapses. Hereinafter, only a simple description will be made for processes same as the processes of the embodiment by adding the same step numbers to FIG. 6.

When the routine under the temporarily abnormal state of the modification example 1 is started, the driving support ECU 10 increases, at a step S201, a value of a regular abnormality determination timer t2 by "1" when the temporary abnormality flag F1 is "1" as well as the vehicle is in the state-with-no-driving-operation. The value of the regular abnormality determination timer t2 is set to "0" when the ignition switch is turned on.

When the vehicle is in the state-with-no-driving-operation (S22: No), the driving support ECU 10 performs the warning to the driver (S23), and when the vehicle speed SPD at the current time is higher than the first vehicle speed SPD1 (S25: No), the driving support ECU 10 decelerates the own vehicle at the first deceleration α1 (S24). When the driving operation by the driver is detected (S22: Yes) in the middle of the repetition of the processes stated above, the driving support ECU 10 proceeds to the step S26 to set the temporary abnormality flag F1 to "0", and at a step S202, clears the value of the regular abnormality determination timer t2 to zero. Therefore, the value of the regular abnormality determination timer t2 represents a time during which the state-with-no-driving-operation continues after the temporary abnormality flag F1 was set to "1".

On the other hand, when the vehicle speed SPD becomes less than or equal to the first vehicle speed SPD1 without any driving operation by the driver being detected, the driving support ECU 10 proceeds to a step S203 to determine whether or not the value of the regular abnormality determination timer t2 is more than or equal to a regular abnormality confirmation time t2ref. When the value of the regular abnormality determination timer t2 is less than the regular abnormality confirmation time t2ref (S203: No), the driving support ECU 10 keeps the vehicle speed at the current vehicle speed at a step S204. In this case, the driving support ECU 10 outputs to the engine ECU 30 and the brake ECU 40 an instruction signal for making the own vehicle travel at a constant speed of the current vehicle speed SPD obtained based on the signal from the vehicle speed sensor 16. Accordingly, a traveling state of the own vehicle is switched from a decelerated traveling which has been performed until that time to a traveling at a constant speed (a constant speed traveling). It should be noted that in a case when the traveling at a constant speed (the constant speed traveling) is continued, it is preferable that the driving support ECU 10 stores the vehicle speed of when the traveling state has been switched from the decelerated traveling to the constant speed traveling and keeps that vehicle speed. In addition, the process at the step S204 does not necessarily require that the vehicle speed is kept at the current vehicle speed. The vehicle may be made to travel at a constant speed set in advance (a safe vehicle speed).

The driving support ECU 10 repeats the processes stated above, and when the value of the regular abnormality determination timer t2 has become more than or equal to the regular abnormality confirmation time t2ref (S203: Yes), the driving support ECU 10 sets, at the step S27, the regular abnormality flag F2 to "1" in place of the temporary abnormality flag F1.

According to the routine under the temporarily abnormal state of the modification example 1 as described above, in a case when the vehicle speed SPD has decreased less than or equal to the first vehicle speed SPD1 with the state-with-no-driving-operation being kept, if the state-with-no-driving-operation has not continued for more than or equal to the predetermined time (the regular abnormality confirmation time t2ref) from the point in time at which "temporarily abnormal" was set, the own vehicle is switched from the decelerated traveling to the constant speed traveling and is made to wait so that the own vehicle does not stop. By making the vehicle travel at a constant speed as mentioned above, it becomes possible to ensure a time for determining whether or not the driver is in the abnormal state. Therefore, the help signal can be transmitted to the help net center HNC at a timing at which the determination accuracy (estimation accuracy) of the driver's abnormal state has been surely raised (at a timing at which a possibility that the driver is in the abnormal state has become very high). Accordingly, erroneous reports to the help net center HNC can be suppressed.

MODIFICATION EXAMPLE 2 OF THE ROUTINE UNDER THE TEMPORARILY ABNORMAL STATE

Next, a modification example 2 of the routine under the temporarily abnormal state will be described. In the modification example 2 of the routine under the temporarily abnormal state, the report permission condition to the help net center HNC is satisfied under a situation where the state-with-no-driving-operation has continued for a predetermined time after the driver's state was set to "temporarily abnormal" (in other words, after the deceleration of the vehicle was started).

Figure 7:
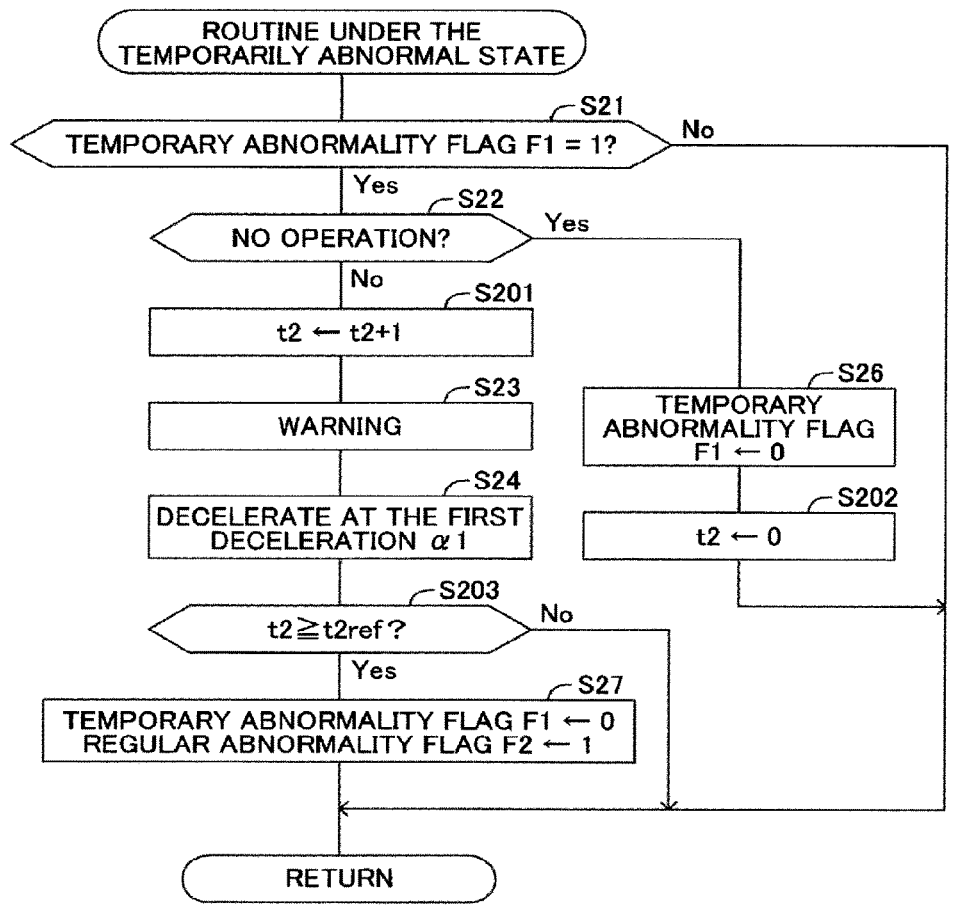
FIG. 7 is a flowchart showing a second modification example of a routine under a temporarily abnormal state.

FIG. 7 shows the modification example 2 of the routine under the temporarily abnormal state. The driving support ECU 10 repeatedly performs a routine under the temporarily abnormal state of the modification example 2 (FIG. 7) instead of the routine under the temporarily abnormal state of the embodiment (FIG. 4) every time a predetermined calculation interval elapses. Hereinafter, only a simple description will be made for processes same as the processes of the embodiment and the modification example 1 by adding the same step numbers to FIG. 7.

When the routine under the temporarily abnormal state of the modification example 2 is started, in a case when the temporary abnormality flag F1 is "1" as well as the vehicle is in the state-with-no-driving-operation (S22: No), the driving support ECU 10 increases the value of the regular abnormality determination timer t2 by "1" (S201), performs the warning to the driver (S23), and decelerates the own vehicle at the first deceleration α1 (S24). Subsequently, the driving support ECU 10 determines, at the step S203, whether or not the value of the regular abnormality determination timer t2 is more than or equal to the regular abnormality confirmation time t2ref. When the value of the regular abnormality determination timer t2 is less than the regular abnormality confirmation time t2ref (S203: No), the driving support ECU 10 tentatively terminates the routine under the temporarily abnormal state.

When the driving operation by the driver is detected (S22: Yes) in the middle of the repetition of the processes stated above, the driving support ECU 10 sets, at the step S26, the temporary abnormality flag F1 to "0", and at the step S202, clears the value of the regular abnormality determination timer t2 to zero. On the other hand, when the value of the regular abnormality determination timer t2 has become more than or equal to the regular abnormality confirmation time t2ref without any driving operation by the driver being detected (S203: Yes), the driving support ECU 10 sets, at the step S27, the regular abnormality flag F2 to "1" in place of the temporary abnormality flag F1.

According to the routine under the temporarily abnormal state of the modification example 2 as described above, in a case when the state-with-no-driving-operation has continued for the regular abnormality confirmation time t2ref after the driver's state was set to "temporarily abnormal" (in other words, after the deceleration of the vehicle was started), the driver's state is set to "regularly abnormal" and the report to the help net center HNC is made. Accordingly, it becomes possible to continue to make the determination whether or not the driver is in the abnormal state during a period from a point in time at which the driver's state has been set to "temporarily abnormal" to a point in time at which the regular abnormality confirmation time t2ref has passed. Therefore, the help signal can be transmitted to the help net center HNC at a timing at which the determination accuracy (estimation accuracy) of the driver's abnormal state has been surely raised (at a timing at which a possibility that the driver is in the abnormal state has become very high). Accordingly, erroneous reports to the help net center HNC can be suppressed. It should be noted that in this case, the regular abnormality confirmation time t2ref is set to a time which is before the vehicle stops based on the abnormality determination permission vehicle speed SPD0 and the first deceleration α1.

The vehicle traveling control apparatuses according to the present embodiment and modification examples have been described. However, the present invention is not limited to the aforementioned embodiment and the modification examples and may adopt various modifications within a scope of the present invention.

For example, in the present embodiment, the abnormality determination of the driver is performed based on the duration time of the state-with-no-driving-operation. However, the abnormality determination of the driver may be performed by making use of a so-called "driver monitor technique" which is disclosed in Japanese Patent Application Laid-Open (kokai) No. 2013-152700 and the like. More specifically, a camera for photographing a driver is provided on an interior member of a vehicle (for example, a steering wheel, a pillar, and the like). The driving support ECU 10 monitors a direction of a driver's line of sight or a driver's face direction using the photographed image by the camera. The driving support ECU 10 determines that the driver is in the abnormal state when the driver's line of sight or the driver's face direction has been in a certain direction for more than or equal to a predetermined time, wherein the certain direction is a direction to which the driver's line of sight or the driver's face direction does not face while driving normally.

In addition, the abnormality determination of the driver may be performed using the confirmation button 20. More specifically, the driving support ECU 10 urges the driver to operate the confirmation button 20 by the indication and/or the sound every time a first time elapses, and determines that the driver is in the abnormal state when a state with no operation of the confirmation button 20 has continued for more than or equal to a second time longer than the first time.

The abnormality determination using the aforementioned photographed image or the confirmation button 20 can be adopted to the determination of the "temporarily abnormal" state (S13), the determination of the "regularly abnormal" state (S22), and the abnormality continuation determination after reporting to the help net center HNC (S34).

Besides, in the present embodiment, the cancel signal is transmitted to the help net center HNC in a case when the driving operation by the driver has been detected after the help signal was transmitted to the help net center HNC. However, the configuration is not limited thereto, but the cancel signal may not be transmitted.

Further, in the present embodiment, the abnormality determination of the driver is performed under the situation where a traveling support control (ACC in the present embodiment) which makes the vehicle travel without the accelerator pedal operation by the driver is being performed, and when the driver's abnormality is detected, the traveling control which makes the vehicle decelerate or stop in place of ACC is performed. However, even under the situation where the ACC is not being performed, when the driver's abnormality is detected, the traveling control which makes the vehicle decelerate or stop may be performed by conducting the aforementioned each control routine.

The invention claimed is:

1. A vehicle traveling control apparatus applied to a vehicle comprising:
   circuitry configured to
   continuously determine whether or not a driver of said vehicle is in an abnormal state where said driver loses an ability to drive said vehicle;
   acquire positional information representing a current position of said vehicle;
   make said vehicle stop by decreasing a vehicle speed of said vehicle to zero after an abnormality determination point in time which is a point in time at which said driver has been determined to be in said abnormal state;
   transmit, to a help net center, said positional information of said vehicle via wireless communication based on a determination result that said driver is in said abnormal state; and
   not transmit said positional information of said vehicle to said help net center until a point in time which is after deceleration of said vehicle was started based on a determination that said driver is in said abnormal state and is before said vehicle is made to stop, and at which a predetermined report permission condition is satisfied in a situation where said determination that said driver is in said abnormal state continues to be made.

2. The vehicle traveling control apparatus according to claim 1, wherein
   said circuitry is configured to start decelerating said vehicle from a temporary abnormality determination point in time which is a point in time at which said driver has been first determined to be in said abnormal state, and
   said report permission condition is satisfied under a situation where an accuracy of said determination has exceeded an accuracy of a determination at said temporary abnormality determination point in time.

3. The vehicle traveling control apparatus according to claim 2, wherein said report permission condition is satisfied when said vehicle speed of said vehicle has decreased to a predetermined set vehicle speed greater than zero after deceleration of said vehicle was started.

4. The vehicle traveling control apparatus according to claim 2, wherein said report permission condition is satisfied when a duration time during which said determination that said driver is in said abnormal state continues to be made has reached a set time after deceleration of said vehicle was started.

5. The vehicle traveling control apparatus according to claim 2, wherein
   said report permission condition is satisfied when said vehicle speed of said vehicle decreases to a predetermined set vehicle speed greater than zero and a duration time during which said determination that said driver is in said abnormal state continues to be made reaches a set time after deceleration of said vehicle was started, and
   said circuitry is configured to:
   start decelerating said vehicle from said temporary abnormality determination point in time; and
   when said vehicle speed of said vehicle decreases to said set vehicle speed before said duration time reaches said set time, keep said vehicle speed of said vehicle and resume decelerating said vehicle after said duration time has reached said set time.

\* \* \* \* \*